(No Model.)
K. TAYLOR.
TESTER FOR SPIRITUOUS LIQUORS.
No. 476,093. Patented May 31, 1892.
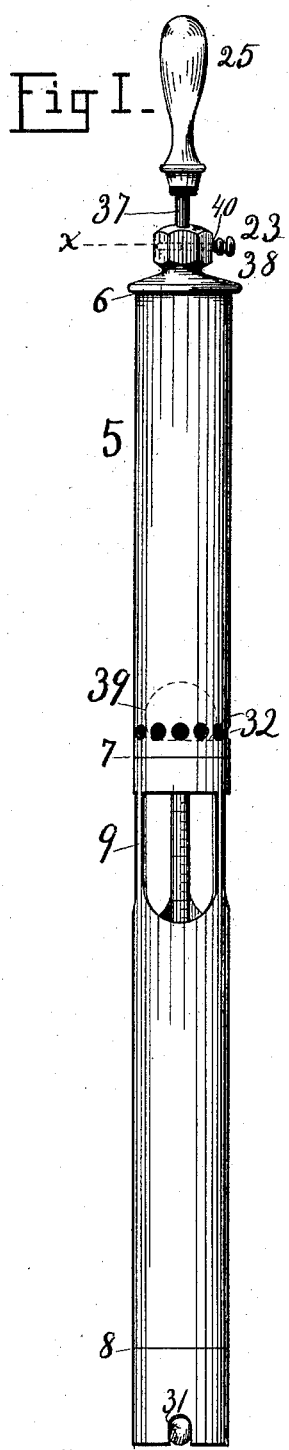
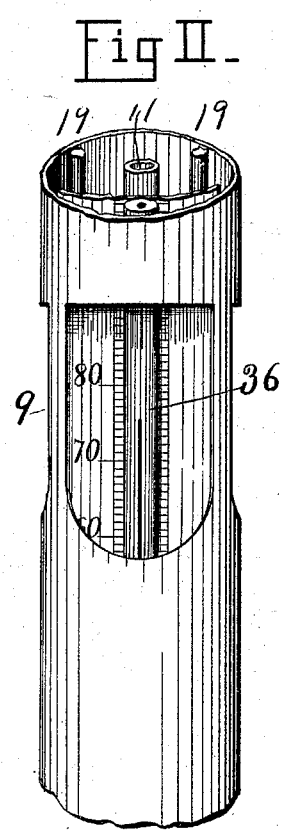
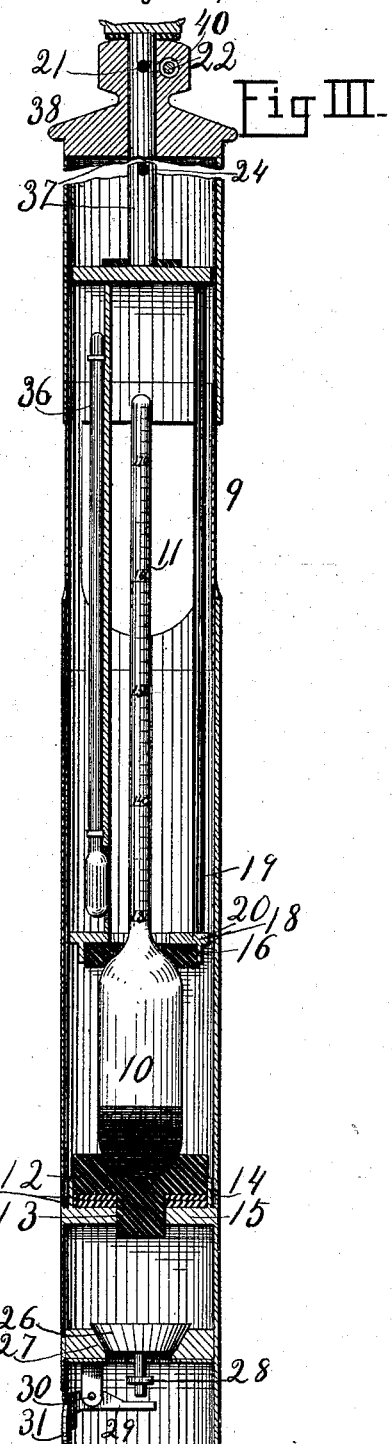
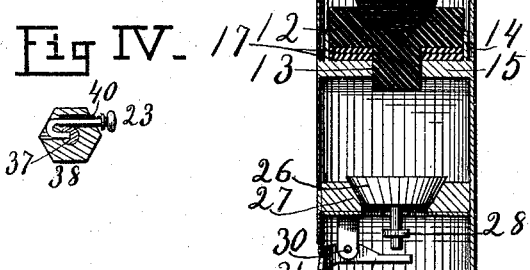
WITNESSES,
P. E. Stevens.
M. C. Hillyard.
INVENTOR.
Kenner Taylor
by W. X. Stevens. Atty.
THE NORRIS PETERS CO., PHOTO-LITHO., WASHINGTON, D. C.

UNITED STATES PATENT OFFICE.

KENNER TAYLOR, OF FRANKFORT, KENTUCKY, ASSIGNOR OF ONE-HALF TO JOHN MEAGHER, OF SAME PLACE.

TESTER FOR SPIRITUOUS LIQUORS.

SPECIFICATION forming part of Letters Patent No. 476,093, dated May 31, 1892.

Application filed October 15, 1891. Serial No. 408,800. (No model.)

*To all whom it may concern:*

Be it known that I, KENNER TAYLOR, a citizen of the United States, residing at Frankfort, in the county of Franklin and State of Kentucky, have invented certain new and useful Improvements in Testers for Spirituous Liquors; and I do hereby declare the following to be a full, clear, and exact description of the invention, such as will enable others skilled in the art to which it appertains to make and use the same.

This invention relates to that class of measuring-instruments by means of which whisky and other spirituous liquors are tested as to that quality which is termed their "proof."

Heretofore it has been the common practice for the gager to dip one or more times a long-handled cup called a "thief" down through the bung-hole of a barrel into the whisky which is to be tested and to draw out thereby enough whisky to nearly fill his test-cup, which cup is provided with a thermometer at one side, where its registry may be read through a window in the cup. In the extremes of hot and cold weather the cup must be repeatedly filled from the barrel to establish the temperature of the whisky in the cup, which can seldom be done with any degree of accuracy. After the temperature of the whisky has thus been approximately determined, a hydrometer such as is prescribed by the United States Government for such purposes being placed in the cup, the specific gravity of the sample of whisky is to be read by observing the line of the hydrometer-scale which is at the top level of the whisky. This operation is rendered very uncertain in its results by the effect of capillary attraction in raising a ring of whisky above its normal level around the stem of the hydrometer, by the wind tipping the hydrometer-stem to one side or ruffling the surface of the whisky, and, further, by the liability of the whisky at the side of the cup, where the thermometer is located, being at a different temperature from the whisky in the middle of the cup, where the hydrometer is.

The object of my invention is to obviate the above and other disadvantages and to render the testing of whisky and other liquors more rapid and accurate and less difficult and wasteful.

To this end my invention consists in the construction and combination of parts forming a "tester for spirituous liquors," hereinafter described and claimed, reference being had to the accompanying drawings, in which—

Figure I represents a tester for spirituous liquors according to my invention in position for the hydrometer to be read. Fig. II shows a fragment of the same, on a larger scale, with the thermometer ready to be read; and Fig. III represents the tester in vertical section with the parts at rest in position for safe storage or transportation. Fig. IV is a cross-section at line $x$ of Fig. I.

5 represents the body or cup, consisting of a thin metallic tube parted at the lines 6, 7, and 8 for convenient access to the inner parts and joined at these places by screw-threads.

36 represents a thermometer, which is supported in the cup by a rod 37, which is fitted to slide out and in through a bearing in the cap 38 of the body.

9 represents two or more apertures through the metallic body 5, covered by an interior glass tube, which is tightly sealed to the body to form a permanent part thereof, whereby the apertures 9 serve as glass windows through which the readings of the thermometer may be made.

10 represents the usual hydrometer prescribed by the United States Government for such test purposes, and 12 is a seat therefor, consisting of a cup-shaped piece of soft rubber provided with a stud 13, which may be supported in the body in any usual manner; but I prefer a cup-shaped metallic portion 14, having a perforated bottom 15 to receive the stud 13, this cup 14 15 being secured to the body 5.

16 represents a ring of soft rubber adapted to surround the hydrometer at its upper shoulder below the stem 11 thereof and to rest closely upon the hydrometer. Thus the hydrometer is safely held when not in service between the soft-rubber seat 12 and ring 16, and the seat is made vertically adjustable by means of washers 17, one or more of which may be inserted, as required, to firmly hold hydrometers of slightly-different sizes. The ring 16 is supported in a frame comprising the cup-shaped annulus 18, one or more rods 19, and a disk 20, attached permanently to the handle-rod 37, and this rod is perforated or notched at 21 to be engaged by a detent 22, which is actuated by a spring 40 and is provided with a finger-knob 23, whereby the handle-rod, with the attached frame and the ring 16, will be securely held when inserted, and 24 shows another perforation or notch in the rod 37, which when the rod is drawn out is engaged by the same detent 22 and held extended.

25 is a handle upon the rod 37.

26 is a valve seated at 27 in the lower end of the cup or body 5 and adapted to open inward, so that when the cup is pushed down into whisky the valve will rise and admit the whisky into the cup and when the cup is again raised the valve will close and hold the whisky therein.

28 is a check-nut upon the valve-stem to prevent accidental displacement of the valve from its seat if the cup should at any time be inverted.

29 represents an elbow-lever pivoted at 30 in an attachment of the cup and adapted when raised to strike the valve-stem and raise the valve to open it.

31 is a finger plate or latch attached to the pendent arm of the elbow-lever and located in an aperture at the side of the cup, but not to project beyond the exterior of the cup.

32 represents discharge-holes through which surplus liquor may escape from the cup.

The operation is as follows: With the handle pushed in let the cup down through the bung-hole of a barrel into the liquor and let it remain there long enough to acquire the temperature thereof. The cup, if immersed, will be quickly filled with liquor; but when the "outs" or "wantage" of a barrel is so great that the whisky does not come up to the discharge-holes 32 it may be filled by a few quick downward thrusts of the cup, which will raise the liquor in it above the level of liquor in the barrel. Now withdraw the cup from the barrel and observe the reading of the thermometer through the window. Then press the knob 23 and release the rod 37 from the detent and quickly draw out the handle until it is again engaged by the detent. When the thermometer, with the frame 18 19, and the rubber ring 16 are thus drawn by the handle out of the whisky, the level of the latter is lowered in the cup and the height of the discharge-holes 32 is experimentally gaged, so that it will contain just enough whisky to cover the thermometer during the reading thereof and will be lowered by the said withdrawal of parts, so that the top of the whisky will be near the middle of the windows, where the readings of the hydrometer, which is now permitted to float by the said withdrawal of its retaining-ring 16, may be accurately observed. It takes longer to describe than to perform this whole operation of testing a sample of liquor, and when the test is made the sample may be returned to the barrel by guiding the lower end of the cup to the bung-hole and then pressing upon the latch 31, which, raising the valve 26, discharges the whisky from the cup into the barrel without having wasted a drop of liquor.

By being able to look through the window along the level of the liquor the exact line of the hydrometer-gage may be seen without any interruption from the capillary rise of liquor around the hydrometer-stem. This is a great advantage over the old metallic cup, above the top of which the readings must be observed looking downward at an uncertain angle, and that through the capillary rising of liquor around the stem. It has also the advantage of keeping the cup closed against all outside influences—such as wind—which would move the hydrometer-stem out of plumb and vary its reading, and dust, which quickly changes the apparent height of the surface of the liquor on the gage. It also has an element of greater accuracy by insuring the temperature of the sample to be that of the liquor within the barrel and in enabling both the temperature and the specific gravity to be read quickly while the sample retains that temperature.

The ease with which this tester may be used obviates the temptation which frequently prevails with the gager in using the old style of cup to put samples from two or more barrels into the cup at one test, by which practice his tests were rendered inaccurate. The old method of dipping with the thief from the bung-hole and pouring repeatedly into the test-cup was a source of waste which amounted to a large sum in every year, and this is avoided by my cup being inserted bodily into the barrel, and that but once, and by returning it in a manner not to spill a drop.

The dotted line 39 represents an opening through the back of the cup, into which the finger of the operator may be introduced to loosen the hydrometer-stem from the side of the cup should the same become attached by a wet contact.

Having thus fully described my invention, what I believe to be new, and desire to secure by Letters Patent, is the following:

1. The combination, in a tester for spirituous liquors, of a cup suitable to enter the bung-hole of a barrel, a valve near the lower end of the cup, a handle fitted to telescope within the cup, a thermometer attached to the handle to move therewith, seats for a hydrometer in the cup and handle, and a window in the cup opposite the normal position of the thermometer, substantially as described.

2. The combination, in a tester for spirituous liquors, of a cup suitable to enter the bung-hole of a barrel, a window in the side of the cup, a handle fitted to telescope within the cup, a thermometer attached to the handle and normally located opposite the window, and a hydrometer located loosely within the cup, substantially as described, whereby the thermometer may be normally located below the liquor-level of the cup to be wholly immersed in the liquor while the temperature is being read and then be drawn up out of the liquor, permitting free access to the thermometer-reading.

3. The combination, in testers for spirituous liquors, of a cup of a size and length adapted to enter the bung-hole of a barrel and having a window in its side, an inlet provided with a valve near the lower end of the cup, and outlets between the window and the top of the cup, and means, substantially as described, for lowering the liquor from the level of the said outlets to a point in the window, for the purpose specified.

4. The combination of a closed cup for spirituous-liquor testers, a valve near the lower end thereof, a thermometer within the tube and attached to a sliding handle, a window in the side of the cup, and outlets above the window, substantially as described, whereby the liquor may escape to a fixed point.

5. The combination, in testers for spirituous liquors, of a closed cup with a glazed window in its side, cushioned seats for a hydrometer in the cup, and a movable handle carrying one of the seats, substantially as described.

6. The combination, in testers for spirituous liquors, of a closed cup having a fixed cushion as a seat for a hydrometer, a valve in the cup, and a rod fitted to slide into the cup and having a frame and a thermometer attached to it, the frame being provided with an annular cushion to engage a hydrometer, substantially as described.

7. The combination, in testers for spirituous liquors, of a closed cup having a valve at its lower end, a rod carrying a thermometer and fitted to steady a hydrometer and provided with a notch at each end, and a spring-detent adapted to engage the said notches, substantially as described.

In testimony whereof I affix my signature in presence of two witnesses.

KENNER TAYLOR.

Witnesses:
W. X. STEVENS,
M. C. HILLYARD.